(12) United States Patent
Saito (10) Patent No.: US 6,871,002 B1
(45) Date of Patent: Mar. 22, 2005

(54) DSM-CC CAROUSEL RECEIVER, RECEIVING METHOD USED THEREFOR, AND RECORDING MEDIUM STORING A CONTROL PROGRAM THEREFOR

(75) Inventor: Shigeru Saito, Tokyo (JP)

(73) Assignee: NEC Corporation, Tokyo (JP)

( * ) Notice: Subject to any disclaimer, the term of this patent is extended or adjusted under 35 U.S.C. 154(b) by 1027 days.

(21) Appl. No.: 09/685,059

(22) Filed: Oct. 5, 2000

(30) Foreign Application Priority Data

Oct. 6, 1999 (JP) ............................................. 11-284984

(51) Int. Cl.[7] .............................. H04N 5/91; H04N 7/00
(52) U.S. Cl. ............................. 386/46; 386/1; 386/45; 386/125; 386/126
(58) Field of Search ............................. 386/46, 1, 45, 386/125, 126

(56) References Cited

U.S. PATENT DOCUMENTS

| 5,768,539 A | * | 6/1998 | Metz et al. .................. 709/249 |
| 6,622,004 B1 | * | 9/2003 | Sonoda et al. ............. 455/3.05 |
| 6,681,075 B1 | * | 1/2004 | Waki et al. .................... 386/46 |

FOREIGN PATENT DOCUMENTS

| JP | 2000-036946 | 2/2000 |
| WO | WO 98/43162 | 10/1998 |
| WO | WO 98/57273 | 12/1998 |
| WO | WO 99/49614 | 9/1999 |

OTHER PUBLICATIONS

Regis J. Crinon, "The DSM–CC Object Carousel for Broadcast Data Services", 1997, pp. 246–247.

Atzori, L., "Multimedia Information Broadcasting Using Digital TV Channels", Sep., 1997, pp. 242–251, vol. 43, No. 3.

* cited by examiner

Primary Examiner—Thai Tran
Assistant Examiner—Alicia M Duggins
(74) Attorney, Agent, or Firm—Foley & Lardner LLP (57) ABSTRACT

This DSM-CC carousel receiver has a DSM-CC section receiving section for receiving a transport stream of MPEG2 (Moving Picture Experts Group-2) and extracting what forming a DSM-CC section, a DSM-CC section analysis section for judging whether the DSM-CC section extracted is DDB configuring the DII unobtained module, a temporary module information setting section for setting temporary module information for the DDB when it is judged to be DDB, which configures the DII unobtained module, by the DSM-CC section analysis section, and a writing section for writing the DDB configuring the DII unobtained module into the storage section according to the temporary module information determined by the temporary module information setting section.

26 Claims, 10 Drawing Sheets

DSM-CC CAROUSEL RECEIVER, RECEIVING METHOD USED THEREFOR, AND RECORDING MEDIUM STORING A CONTROL PROGRAM THEREFOR

BACKGROUNDS OF THE INVENTION

1. Field of the Invention

The present invention relates to a DSM-CC (Digital Storage Media-Command and Control) carousel receiver, a receiving method used therefor and a recording medium having recorded its control program, and more particularly to a method of receiving the DSM-CC carousel used for data broadcasting service.

2. Description of the Related Art

Recently, data broadcasting has come to be served by digital broadcasting etc., and DSM-CC carousel "data carousel (Data Carousel)" is now used as one of methods therefor.

The data carousel is a method by which a server regularly sends a plurality of different data to the same channel. A client can check a type of data being sent out currently to obtain necessary data. Namely, the client usually needs only a certain part of the plurality of data.

The DSM-CC carousel is comprised of two types of sections, namely DII (Download Info Indication) and DDB (Download Data Block) as specified by ISO/IEC 13818-6, and is a method of repeatedly sending out them.

Information on the module being sent out is included in the section of DII, and data which actually configures the module is included in the section of DDB.

It is essential for the aforesaid conventional method of receiving the DSM-CC carousel to receive DII first because it is necessary to acquire information on the total number of modules and each module size in order to receive the module. DDBs received before DII is received are discarded as invalid data and must be received again after the reception of DII. Therefore, there is a disadvantage that it may take time to perform the module receiving processing.

SUMMARY OF THE INVENTION

It is an object of the present invention to remedy the above disadvantages and to provide a DSM-CC carousel receiver and a receiving method used therefor by which reception can be made without discarding the obtained DSM-CC section and the module receiving time can be shortened.

According to the first aspect of the invention, a A DSM-CC carousel receiver which receives data and stores the same into a storage means by using DSM-CC (Digital Storage Media-Command and Control) carousel comprised of two types of sections, DII (Download Info Indication) including information related to a module being sent out and DDB (Download Data Block) including data configuring the module, comprises a DSM-CC section receiving means for receiving a transport stream of MPEG2 (Moving Picture Experts Group2) and extracting what forming a DSM-CC section, a DSM-CC section analysis means for judging whether the DSM-CC section extracted by the DSM-CC section receiving means is DDB configuring the DII unobtained module, a temporary module information setting means for setting temporary module information for the DDB when it is judged to be DDB, which configures the DII unobtained module, by the DSM-CC section analysis means, and a writing means for writing the DDB configuring the DII unobtained module into the storage means according to the temporary module information determined by the temporary module information setting means.

In the preferred construction, the DSM-CC section analysis means has the DDB analysis means for judging whether the DII is obtained or not by analyzing the DDB when the DSM-CC section extracted by the DSM-CC section receiving means is the DDB.

In another preferred construction, the DSM-CC carousel receiver further comprises a DDB temporary storage means for temporarily storing the received DDB when a size of the module data included in one section of the DDB is unknown, the DDB analysis means calculating a data size of one section from a section size of the received DDB and the DDB temporarily stored in the DDB temporary storage means.

In another preferred construction, the DDB analysis means judges the data size from a condition that when a block position of the acquired DDB is a predetermined value, a size of actual data area of the DDB is determined to be a data size for one section of DDB and a condition that sizes of actual data areas of two DDBs having the same module identification are compared, and a size of an actual data area of DDB having a smaller value of block position values between the DDBs is determined as a data size for one section of DDB.

In another preferred construction, the DSM-CC section receiving means has a transport stream receiving means for receiving a transport stream of MPEG2 (Moving Picture Experts Group-2), and a section receiving means for extracting what forming a DSM-CC section from the transport stream received by the transport stream receiving means and giving it to the DSM-CC section analysis means.

In another preferred construction, the DSM-CC section analysis means has the DDB analysis means for judging whether the DII is obtained or not by analyzing the DDB when the DSM-CC section extracted by the DSM-CC section receiving means is the DDB, and the DSM-CC section receiving means has a transport stream receiving means for receiving a transport stream of MPEG2 (Moving Picture Experts Group-2), and a section receiving means for extracting what forming the DSM-CC section from the transport stream received by the transport stream receiving means and giving it to the DSM-CC section analysis means.

In another preferred construction, the DSM-CC carousel receiver further comprises a DDB temporary storage means for temporarily storing the received DDB when a size of module data included in one section of the DDB is unknown, wherein the DSM-CC section analysis means has the DDB analysis means for judging whether the DII is obtained or not by analyzing the DDB when DSM-CC section extracted by the DSM-CC section receiving means is the DDB, the DDB analysis means calculates a data size of one section from DDB temporarily stored in the DDB temporary storage means and the section size of the received DDB, and the DSM-CC section receiving means has a transport stream receiving means for receiving a transport stream of MPEG2 (Moving Picture Experts Group-2), and a section receiving means for extracting what forming the DSM-CC section from the transport stream received by the transport stream receiving means and giving it to the DSM-CC section analysis means.

In another preferred construction, the DDB analysis means judges the data size from a condition that when a block position of the acquired DDB is a predetermined value, a size of actual data area of the DDB is determined to be a data size for one section of DDB and a condition that sizes of actual data areas of two DDBs having the same module identification are compared, and a size of an actual data area of DDB having a smaller value of block position values between the DDBs is determined as a data size for one section of DDB.

In another preferred construction, the DSM-CC carousel analysis means has a DII analysis means for extracting the described module information by analyzing the DII when the DSM-CC section extracted by the DSM-CC section receiving means is the DII.

In another preferred construction, the writing means has a writing position identification means for calculating a writing position within the module of the actual data area of the obtained DDB, and a module writing means for writing the actual data area of the DDB into the storage means according to the writing position calculated by the writing position identification means.

In another preferred construction, the DSM-CC carousel receiver further comprises a program identification means for identifying whether one section of the received DSM-CC section is included in a program to be received when each DSM-CC carousel is a unit of the program in a state that the DSM-CC carousels can be received in multiple simultaneously.

In another preferred construction, the DSM-CC carousel receiver further comprises a progress status display means for showing the progress of reception of the DSM-CC carousel.

According to the second aspect of the invention, a DSM-CC carousel receiving method which uses a DSM-CC (Digital Storage Media-Command and Control) carousel comprised of two types of sections, DII (Download Info Indication) including information related to a module being sent out and DDB (Download Data Block) including data configuring the module, to receive data and stores the same into a storage means, comprising the following steps of:

receiving a transport stream of MPEG2 (Moving Picture Experts Group-2) and extracting what forming a DSM-CC section, judging whether the DSM-CC section extracted is DDB configuring the DII unobtained module, setting temporary module information for the DDB when it is judged to be DDB, which configures the DII unobtained module, and writing the DDB configuring the DII unobtained module into the storage means according to the temporary module information.

In the preferred construction, the DSM-CC carousel receiving method further comprises a step of analyzing the DDB when the DSM-CC section extracted from the received transport stream is the DDB and judging whether the DII is received or not.

In another preferred construction, the DDI unacquisition judging step calculates a data size of one section from a section size of the received DDB and the DDB temporarily stored in the DDB temporary storage means which temporarily stores the received DDB when a data size of the module data included in the one section of the DDB is unknown.

In another preferred construction, the DII unacquisition judging step judges the data size from a condition that when a block position of the acquired DDB is a predetermined value, a size of actual data area of the DDB is determined to be a data size for one section of DDB and a condition that sizes of actual data areas of two DDBs having the same module identification are compared, and a size of an actual data area of DDB having a smaller value of block position values between the DDBs is determined as a data size for one section of DDB.

In another preferred construction, the DSM-CC carousel receiving method further comprises a step of extracting the described module information by analyzing the DII when the DSM-CC section extracted by the DSM-CC section extracting step is the DII.

In another preferred construction, the step of writing into the storage means has a step of calculating a writing position in a module of the actual data area of the obtained DDB, and a step of writing the actual data area of the DDB into the storage means according to the calculated writing position.

In another preferred construction, the DSM-CC carousel receiving method further comprises a step of identifying whether one section of the received DSM-CC section is included in a program to be received when each DSM-CC carousel is a unit of the program in a state that the DSM-CC carousels can be received in multiple simultaneously.

According to another aspect of the invention, a computer readable memory for storing a DSM-CC (Digital Storage Media-Command and Control) carousel reception control program which makes a DSM-CC carousel received in a DSM-CC carousel receiver which uses the DSM-CC carousel comprised of two types of sections, DII (Download Info Indication) including information related to a module being sent out and DDB (Download Data Block) including data configuring the module, to receive data and stores it into a storage means, characterized in that the DSM-CC carousel reception control program:

receives a transport stream of MPEG2 (Moving Picture Experts Group-2) into the DSM-CC carousel receiver and extracts what forming a DSM-CC section;

judges whether the extracted DSM-CC section is DDB configuring the DII unobtained module;

sets temporary module information for the DDB when it is judged to be DDB configuring the DII unobtained module; and writes the DDB configuring the DII unobtained module into the storage means according to the temporary module information.

In other words, the DSM-CC carousel receiver of the present invention can receive the DSM-CC carousel efficiently.

Specifically, in the DSM-CC carousel receiver of the present invention, a transport stream (hereafter, it is called the TS stream) receiving means receives the TS stream of MPEG2 (Moving Picture Experts Group-2).

Then, a section receiving means extracts one forming the DSM-CC section from the received TS stream and gives it as DSM-CC section to a DSM-CC section analysis means. The DSM-CC section analysis means identifies whether the received DSM-CC section was received for the first time, and if yes, performs the next processing.

When the received DSM-CC section is DII, a DII analysis means analyzes the DII and extracts the described module information. The extracted module information is stored in a module information storage means.

When the received DSM-CC section is DDB, a DDB analysis means analyzes the DDB to extract the module identification of DDB, then judges whether information on DII related to the module is stored in the module information storage means.

When the information on DII is stored in the module information storage means, a writing position identification means calculates a writing position in the module of an actual data area (hereinafter, the module data) of the acquired DDB. Then, a module writing means stores the module data in the calculated writing position in the module storage means.

When the information on DII related to the module is not stored in the module information storage means, the DDB analysis means judges whether the data size for one section of the DDB has become apparent. When the data size of one section is known, the DDB analysis means refers to the module information storage means and judges whether a "temporary module name" of the pertinent module is decided or not.

When the "temporary module name" has been decided, the writing position identification means calculates a writing position in the module of the obtained module data. Then, the module writing means stores the module data in the calculated writing position in the module storage means. If the "temporary module name" has not been decided, a temporary module information setting means gives the "temporary module name" to the module and stores it in the module information storage means.

When the data size of one section of DDB is unknown, the DDB analysis means stores the content of the acquired DDB in the DDB temporary storage means. The above processing is repeatedly performed until all modules are obtained.

Thus, even when DDB configuring the DII unobtained module is received, all DDB sections are received as effective data so to write the module by setting temporary module information by the temporary module information setting means and calculating a data size of one section from the section size of DDB. Therefore, discarding or the like does not occur, and reception can be made without discarding the obtained DSM-CC section, and the module receiving time can be shortened.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

Figure 1:
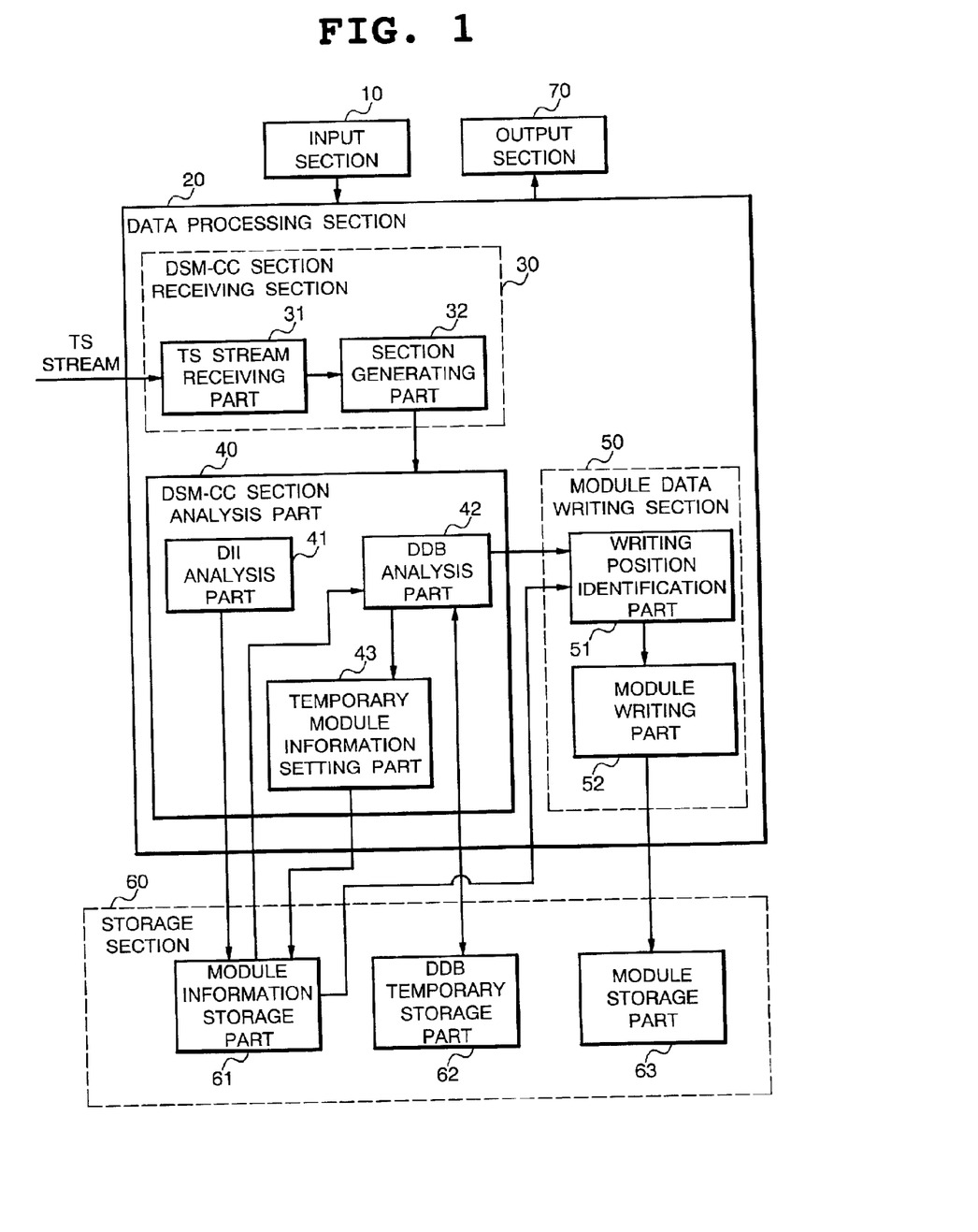
FIG. 1 is a block diagram showing a structure of the DSM-CC carousel receiver according to a first embodiment of the present invention.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention. FIG. 1 is a block diagram showing a structure of the DSM-CC (Digital Storage Media-Command and Control) carousel receiver according to a first embodiment of the present invention.

It is seen in FIG. 1 that the DSM-CC carousel receiver according to the first embodiment of the invention comprises an input section 10 such as a keyboard, a data processing section 20 which operates under program control, a storage section 60 which stores information on modules to be received and module data, and an output section 70 such as a display or a printer. The data processing section 20 is comprised of a DSM-CC section receiving section 30, a DSM-CC section analysis part 40 and a module data writing section 50.

The DSM-CC section receiving section 30 has a TS (transport) stream receiving part 31 and a section generating part 32. And, the DSM-CC section analysis part 40 has a DII (Download Info Indication) analysis part 41, a DDB (Download Data Block) analysis part 42 and a temporary module information setting part 43.

The module data writing section 50 has a writing position identification part 51 and a module writing part 52. And the storage section 60 has a module information storage part 61, a DDB temporary storage part 62 and a module storage part 63.

The TS stream receiving part 31 receives a TS stream of MPEG2. The section receiving part 32 extracts what forming a DSM-CC section from the received TS stream and gives it as the DSM-CC section to the DSM-CC section analysis part 40.

The DSM-CC section analysis part 40 extracts an unreceived DSM-CC section with reference to the acquired section information stored in the module information storage part 61. The DII analysis part 41 analyzes DII to extract the described module information and stores it into the module information storage part 61.

The DDB analysis part 42 analyzes DDB to extract module data which configures the module. The DDB analysis part 42 refers to the module information storage part 61 to judge whether DII concerning the module has been obtained and whether a "temporary module name" has been given even if DII has not been obtained.

The temporary module information setting part 43 sets a "temporary module name" about a module not having obtained DII information.

The writing position identification part 51 identifies which part of the module corresponds to the module data in view of the obtained DDB and the data size for one section of DDB.

The module writing part 52 stores the module data into the module storage part 63. At that time, a writing position of the module data is the writing position calculated by the writing position identification part 51.

The module information storage part 61 stores information necessary to store the received module, such as a total of modules to be received and sizes of individual modules, into the module storage part 63.

The DDB temporary data storage part 62 temporarily stores the received DDB when the size of the module data included in one section of DDB is unknown. The module storage part 63 stores the content of the actually received module.

Figure 2:
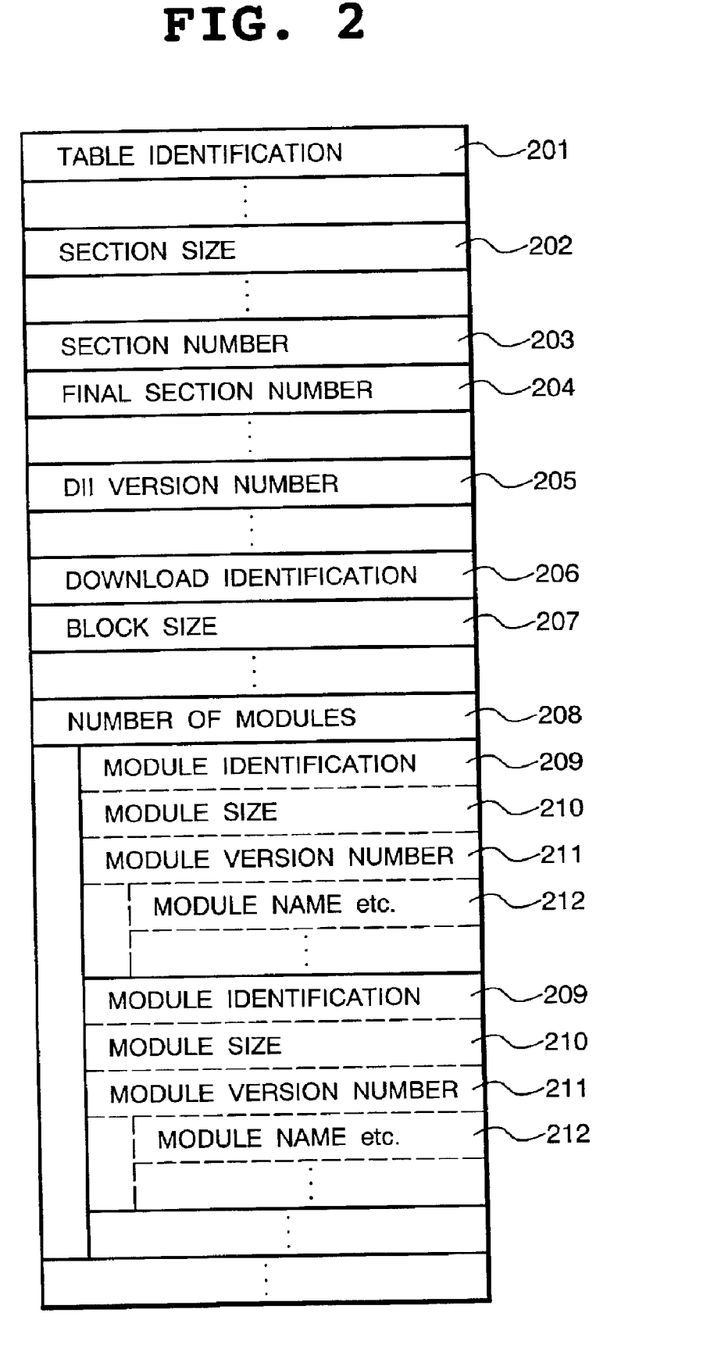
FIG. 2 is a diagram showing the outline of a data structure of DII.

FIG. 2 is a diagram showing an outline of the data structure of DII. It is seen in FIG. 2 that DII includes at least table identification 201, section size 202, section number 203, final section number 204, DII version number 205, download identification 206, block size 207, number of modules 208, module identification 209, module size 210, module version number 211 and module name etc. 212.

Figure 3:
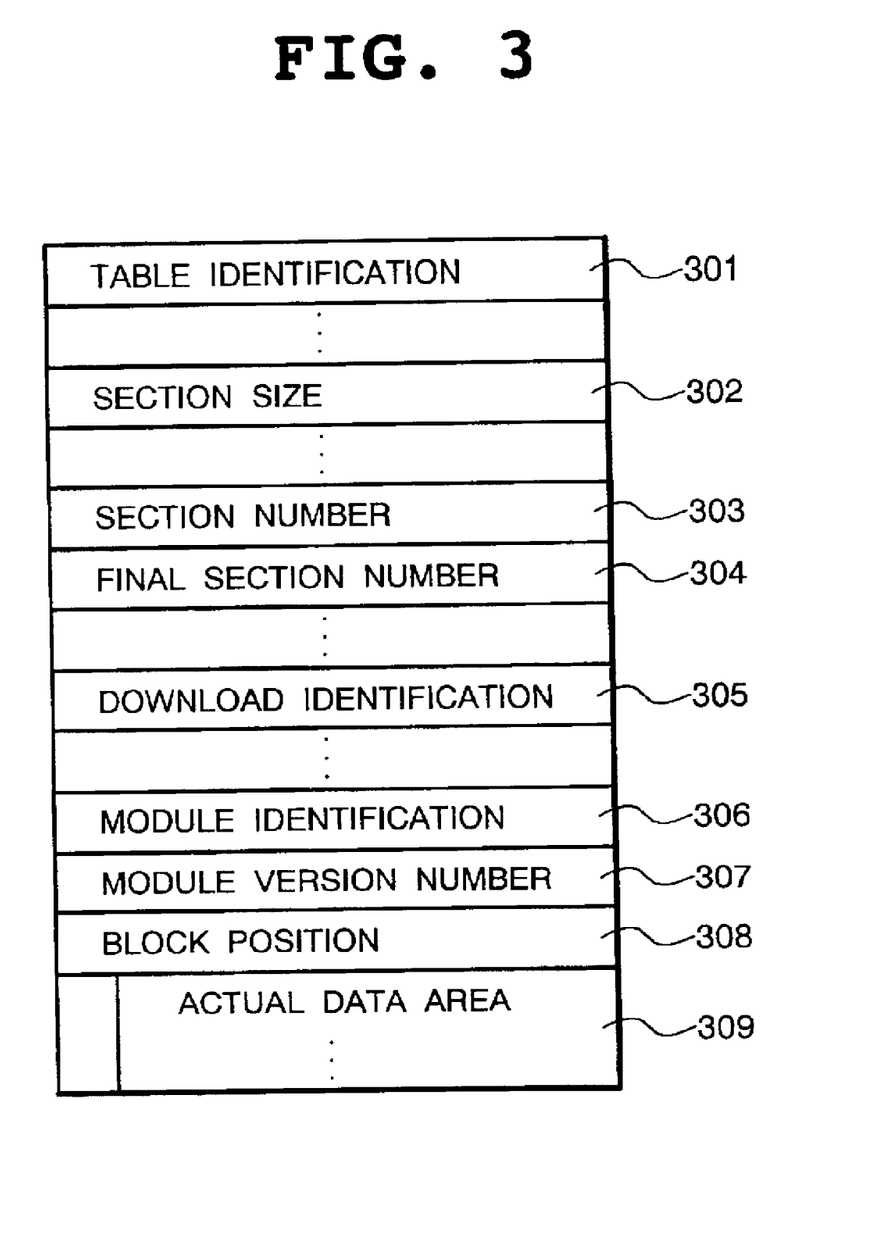
FIG. 3 is a diagram showing the outline of a data structure of DDB.

FIG. 3 is a diagram showing an outline of the DDB data structure. It is seen in FIG. 3 that DDB includes at least table identification 301, section size 302, section number 303, final section number 304, download identification 305, module identification 306, module version number 307, block position 308 and actual data area 309.

Figure 4:
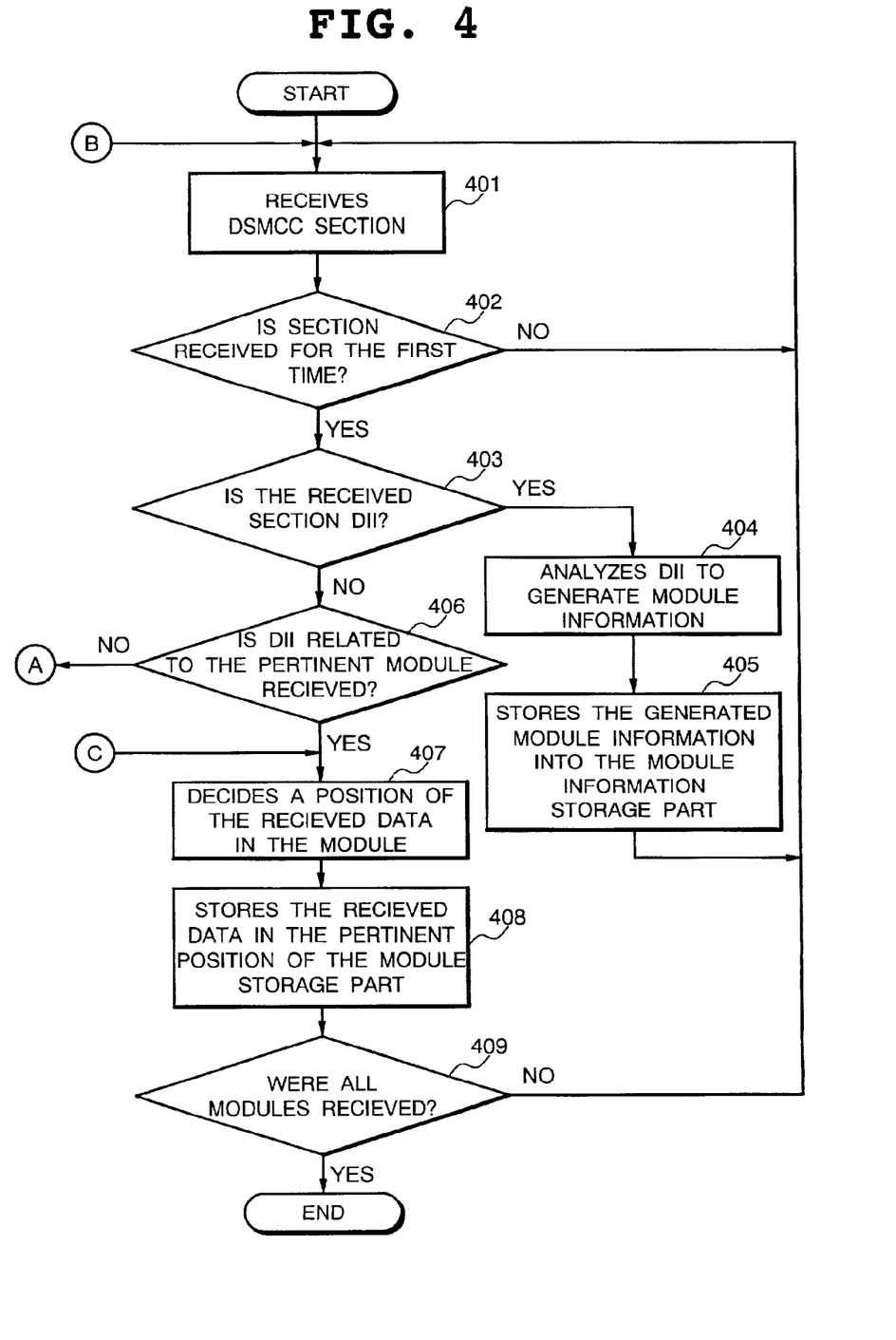
FIG. 4 is a flowchart showing a DSM-CC carousel receiver's processing operation according to the first embodiment of the present invention.
Figure 5:
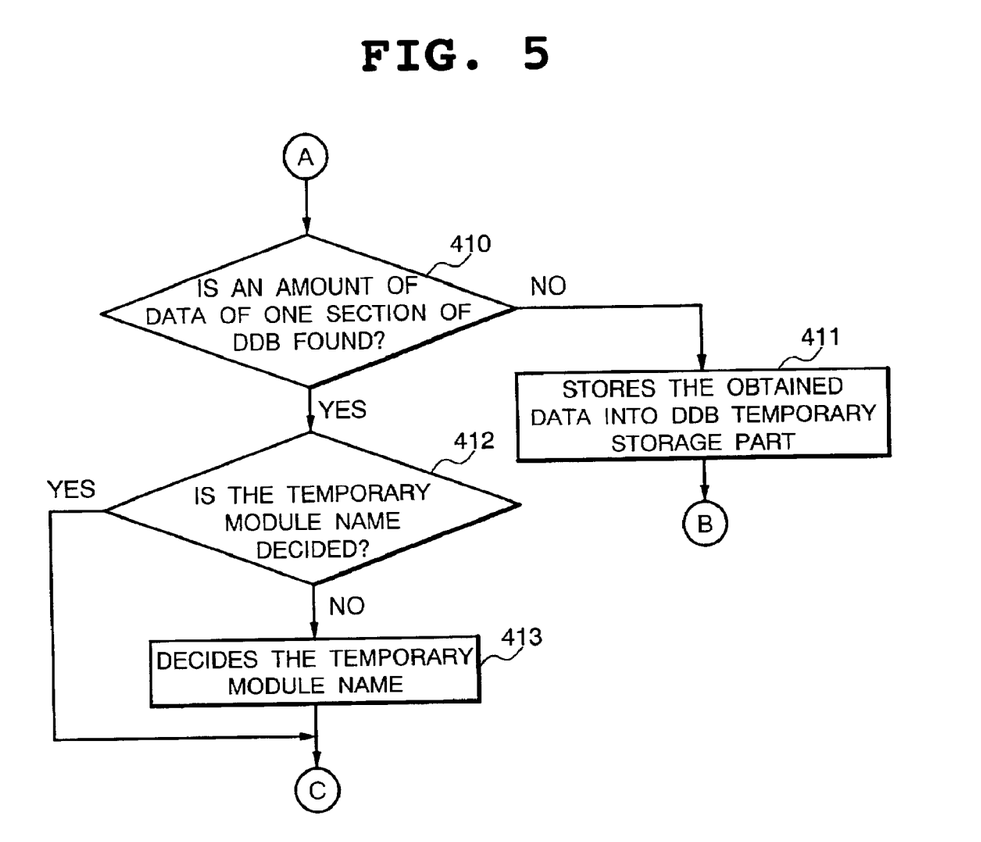
FIG. 5 is a flowchart showing a DSM-CC carousel receiver's processing operation according to the first embodiment of the present invention.

FIG. 4 and FIG. 5 are flowcharts showing DSM-CC carousel receiver's processing operations according to the first embodiment of the present invention. Referring to FIG. 1 to FIG. 5, the processing operations of the DSM-CC carousel receiver according to the first embodiment of the present invention will be described.

First, the TS stream receiving part 31 receives a TS stream. The section receiving part 32 forms a section from the received TS stream, refers to the table identification of the formed section to extract what corresponding to a DSM-CC section, and gives it to the DSM-CC section analysis part 40 (step 401 in FIG. 4).

The DSM-CC section analysis part 40 identifies whether the received DSM-CC section is one received for the first time (step 402 in FIG. 4). As an identification method thereof, the section numbers of the obtained DII and DDB are stored in the module information storage part 61, and compared with the section number of the received DSM-CC section. And, when the pertinent section numbers are not stored in the module information storage part 61, it is judged received for the first time. If it is an already received section, the process goes back to step 401 and waits for the reception of the next DSM-CC section.

Then, the DSM-CC section analysis part 40 refers to the table identification to judge whether the received DSM-CC section is DII or DDB (step 403 in FIG. 4). When the DSM-CC section is DII, the DII analysis part 41 analyzes the DII and extracts module information written therein (step 404 in FIG. 4). Among the data configuring the DII, main data are shown in FIG. 2 (for details of the DII structure, see ISO/IEC 13818-6).

The module information extracted by the DII analysis part 41 is stored in the module information storage part 61 (step 405 in FIG. 4). The module information to be stored are block sizes, number of received modules, module identification of individual modules, module sizes, module names and the like. Then, the process returns to step 401 and waits for reception of the next DSM-CC section.

Meanwhile, when the DSM-CC section is DDB, the DDB analysis part 42 analyzes the DDB to extract the module identification of the pertinent DDB. Main data in the data configuring the DDB are shown in FIG. 3.

The DDB analysis part 42 judges whether information on DII about the pertinent module (one with module identification) is stored in the module information storage part 61 (step 406 in FIG. 4). When it is judged by the DDB analysis part 42 that the information on DII is stored in the module information storage part 61, the writing position identification part 51 calculates a writing position of the acquired module data in the module (step 407 in FIG. 4). This method of calculating the writing position uses the block size of DII and the block position of DDB.

The module writing part 52 stores the module data in the writing position calculated by the writing position identification part 51 of the module storage part 63 (step 408 in FIG. 4).

On the other hand, when information on DII related to the pertinent module is not stored in the module information storage part 61, the DDB analysis part 42 judges whether the data size for one section of DDB has become apparent (step 410 in FIG. 5). As a method of judging the data size, a first-matched one is selected between the two following conditions and determined as a data size for one section of DDB of the pertinent module.

Specifically, the conditions of the method of judging data size include (1) a condition that when the value of "block position" of the acquired DDB is 0, a size of the actual data area of the pertinent DDB is determined as a data size for one section of DDB, and (2) a condition that the sizes of actual data areas of two DDBs having the same "module identification" are compared, and the size of actual data area of DDB having a smaller one between the "block position" values of the respective DDBs is determined as a data size for one section of DDB. Therefore, the DDB temporary storage part 62 stores DDB whose data size for one section is unknown.

When a data size for one section is known, the DDB analysis part 42 refers to the module information storage part 61 to judge whether "temporary module name" of the pertinent module is decided or not (step 412 in FIG. 5).

When the "temporary module name" has been decided, the writing position identification part 51 calculates a writing position in the module of the obtained module data (step 407 in FIG. 4). The module writing part 52 stores the pertinent module data in the writing position calculated by the writing position identification part 51 of the module storage part 63 (step 408 in FIG. 4).

When the "temporary module name" has not been decided, the temporary module information setting part 43 gives "temporary module name" to the module and stores the same in the module information storage part 61 (step 413 in FIG. 5). For example, the value of "module identification" may be used as a method of giving the "temporary module name". When it is assumed that the value of module identification is "01F (hexadecimal number)", the "temporary module name" may be "01F.tmp".

When a data size for one section of DDB is unknown, the DDB analysis part 42 stores the content of the obtained DDB into the DDB temporary storage part 62 and waits for the reception of the next DSM-CC section (step 411 in FIG. 5). DDB stored in the DDB temporary storage part 62 is used when the data size for one section of DDB is judged in step 410.

The DSM-CC section analysis part 40 repeats the above-mentioned processing until all modules are obtained (steps 401 to 409 in FIG. 4, and steps 410 to 413 in FIG. 5).

Thus, even if the DDB configuring the DII unobtained module has been received, discarding or the like does not occur because all DDB sections are received as effective data so to write the module by setting temporary module information in the temporary module information setting part 43 or calculating the data size for one section from the section size of DDB. Therefore, the obtained DSM-CC section can be received without discarding, and the module receiving time can be shortened.

Figure 6:
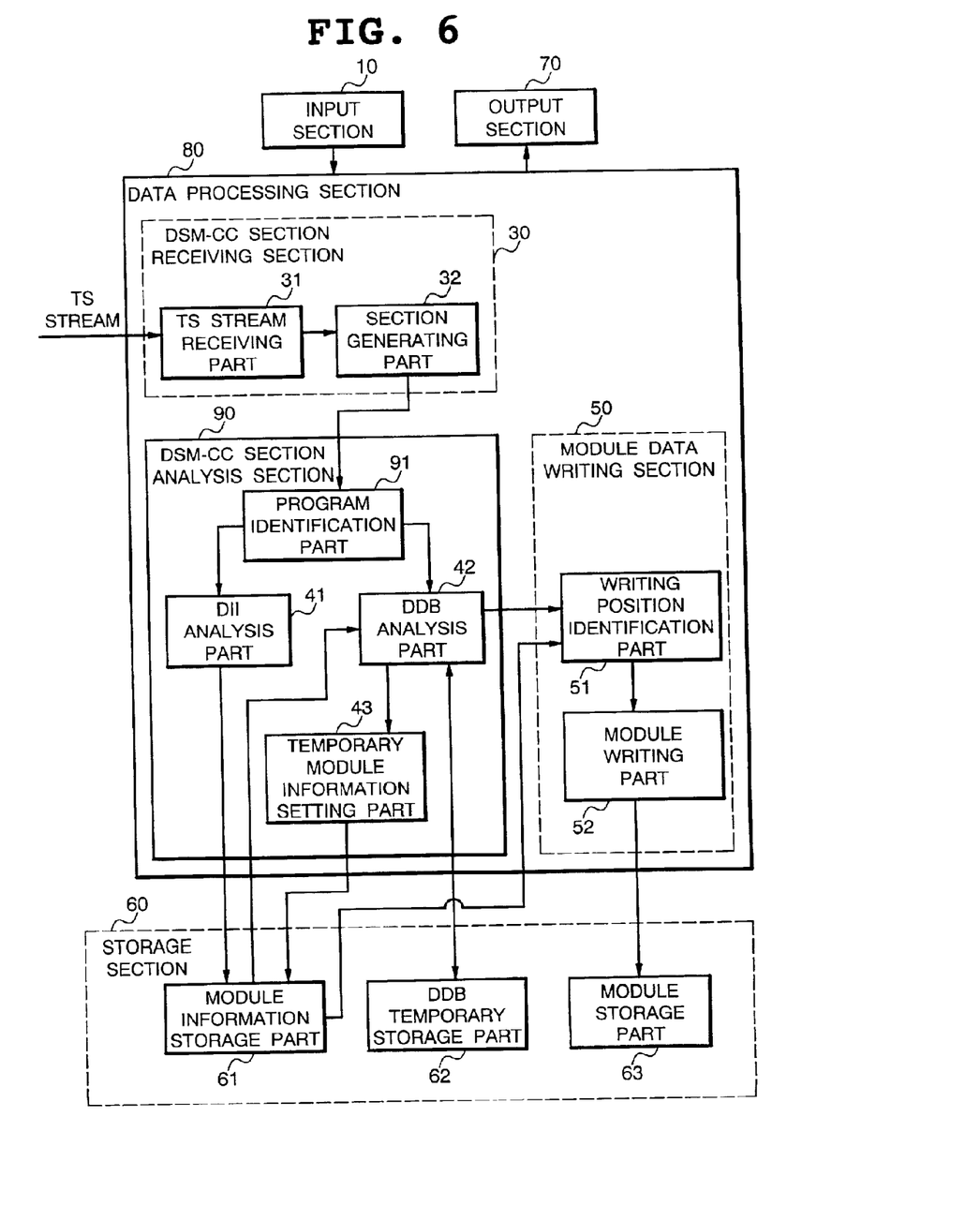
FIG. 6 is a block diagram showing a DSM-CC carousel receiver's structure according to a second embodiment of the present invention.

FIG. 6 is a block diagram showing a structure of the DSM-CC carousel receiver according to a second embodiment of the present invention. The DSM-CC carousel receiver shown in FIG. 6 according to the second embodiment of the invention has the same configuration as that of the DSM-CC carousel receiver shown in FIG. 1 according to the first embodiment of the invention except that a program identification part 91 is added to a DSM-CC section analysis section 90 which configures a data processing section 80, and like reference numerals are used to designate like components. Operations of the same components are the same as those of the DSM-CC carousel receiver according to the first embodiment of the invention.

When it is a state capable of receiving a plurality of DSM-CC carousels simultaneously and the respective DSM-CC carousels are units such as "programs", the program identification part 91 identifies whether one section of the received DSM-CC section is included in a program to be received.

Figure 7:
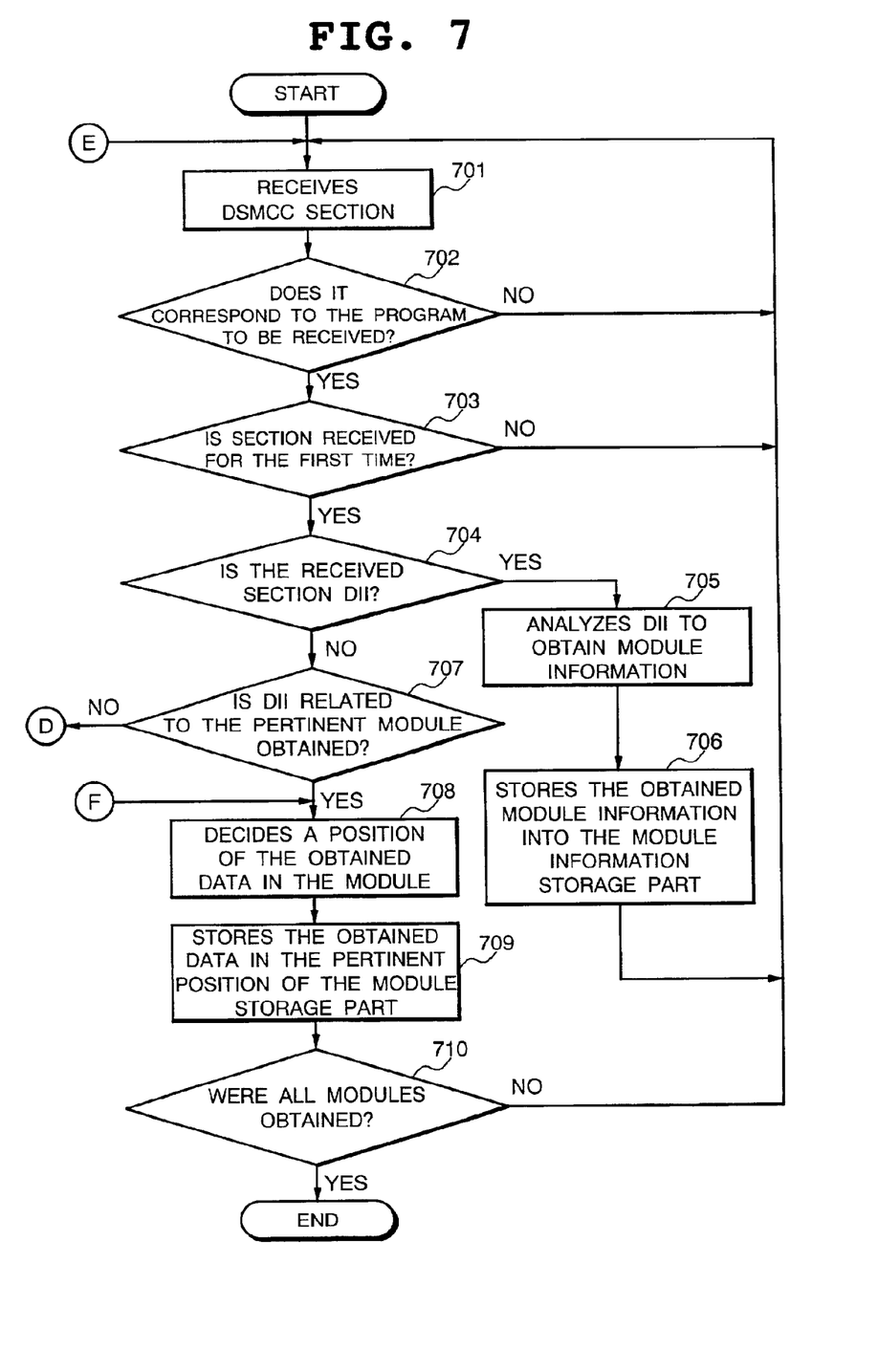
FIG. 7 is a flowchart showing a DSM-CC carousel receiver's processing operation according to the second embodiment of the present invention.
Figure 8:
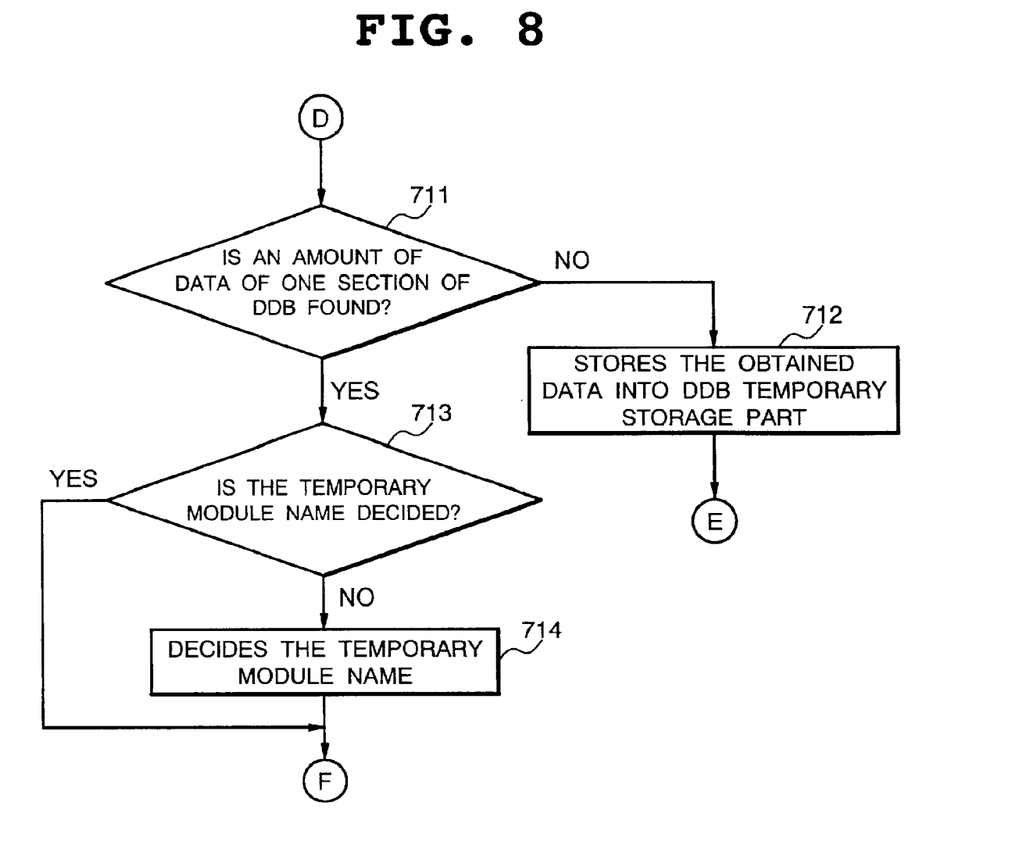
FIG. 8 is a flowchart showing a DSM-CC carousel receiver's processing operation according to the second embodiment of the present invention.

FIG. 7 and FIG. 8 are flowcharts showing the processing operations of the DSM-CC carousel receiver according to the second embodiment of the invention. Referring to FIG. 6 to FIG. 8, the processing operations of the DSM-CC carousel receiver according to the second embodiment of the invention will be described.

First, the TS stream receiving part 31 receives a TS stream. The section receiving part 32 forms a section from the received TS stream, refers to table identification of the formed section to extract one corresponding to DSM-CC section, and gives it to the DSM-CC section analysis section 90 (step 701 in FIG. 7).

When the DSM-CC section is given to the DSM-CC section analysis section 90, the program identification part 91 judges whether the received DSM-CC section is of a program to be received now (step 702 in FIG. 7). There are a method of selecting only the same values of "download identification" and the like which compares the values of "download identification" as the data used for judging.

When it is the one included in the program to be received now, step 703 and following processing are performed. Meanwhile, when it is not the program to be received now, the process returns to step 701 and receives the next DSM-CC section.

Step 703 and later processing steps (steps 703 to 710 in FIG. 7, and steps 711 to 714 in FIG. 8) are the same as those of the TS stream receiving part 31, the section receiving part 32, the DII analysis part 41, the DDB analysis part 42, the temporary module information setting part 43, the writing position identification part 51 and the module writing part 52 (steps 402 to 409 in FIG. 4, steps 410 to 413 in FIG. 5) of the DSM-CC carousel receiver according to the first embodiment of the invention. Therefore, their processing operations will not be described.

Thus, when a plurality of programs can be received at the same time, only a necessary DSM-CC section can be extracted by the program identification part 91, so that the file resource can be used efficiently.

Figure 9:
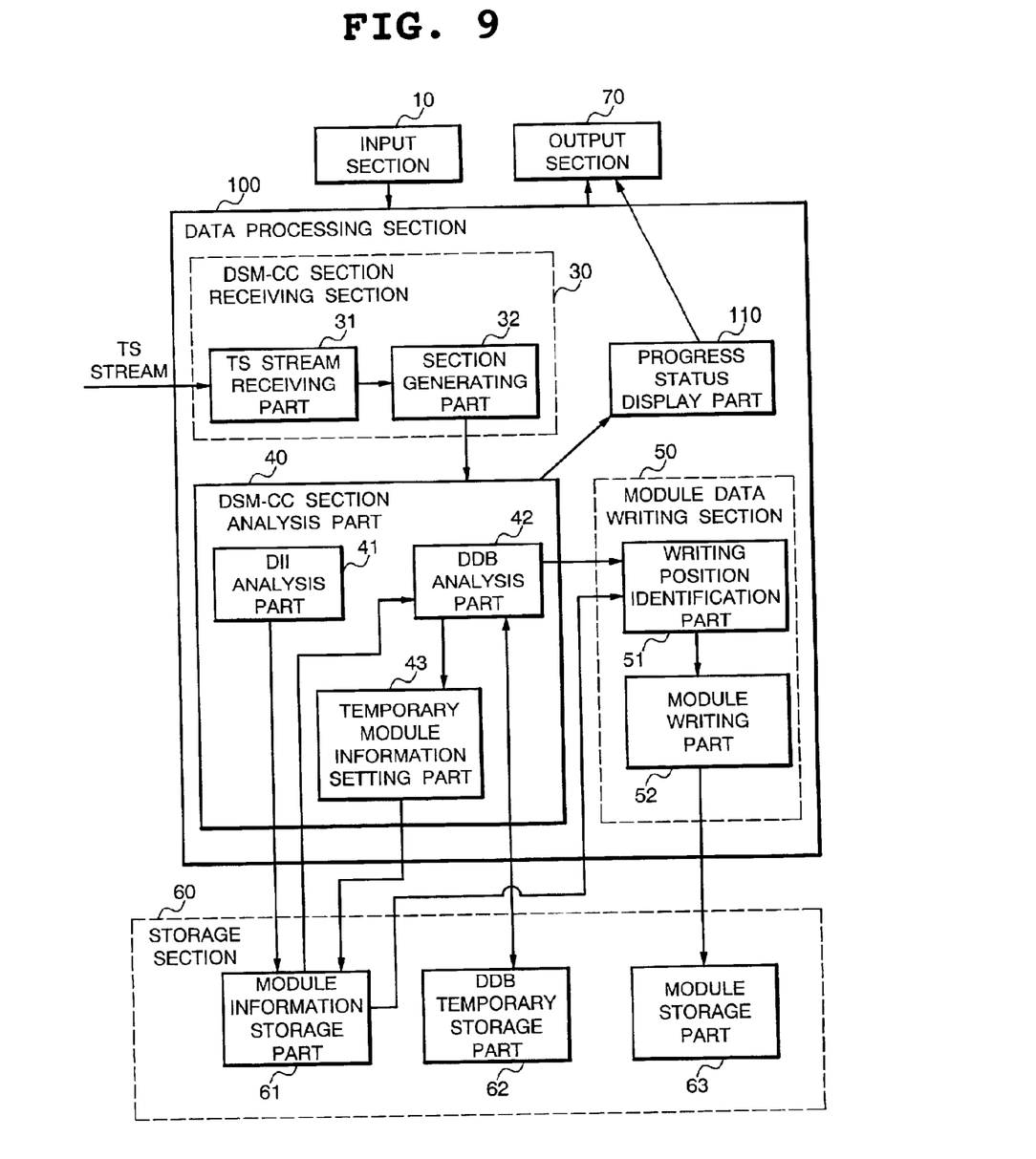
FIG. 9 is a block diagram showing a DSM-CC carousel receiver's structure according to a third embodiment of the present invention.

FIG. 9 is a block diagram showing a structure of the DSM-CC carousel receiver according to a third embodiment of the invention. The DSM-CC carousel receiver shown in FIG. 9 according to the third embodiment of the invention has the same structure as that of the DSM-CC carousel receiver shown in FIG. 1 according to the first embodiment of the present invention except that a progress status display part 110 is added to a data processing section 100, and like reference numerals are used to designate like components. And, operations of the same components are the same as those of the DSM-CC carousel receiver according to the first embodiment of the invention.

The progress status display part 110 shows a state of the pertinent module at the output section 70. What is displayed may include a total number of modules to be received, names of modules being received, sizes of received modules, a ratio of received data to the sizes of modules being received and the like.

Thus, the use of the aforesaid progress status display part 110 provides an effect that the user can easily know a state of receiving the modules.

Figure 10:
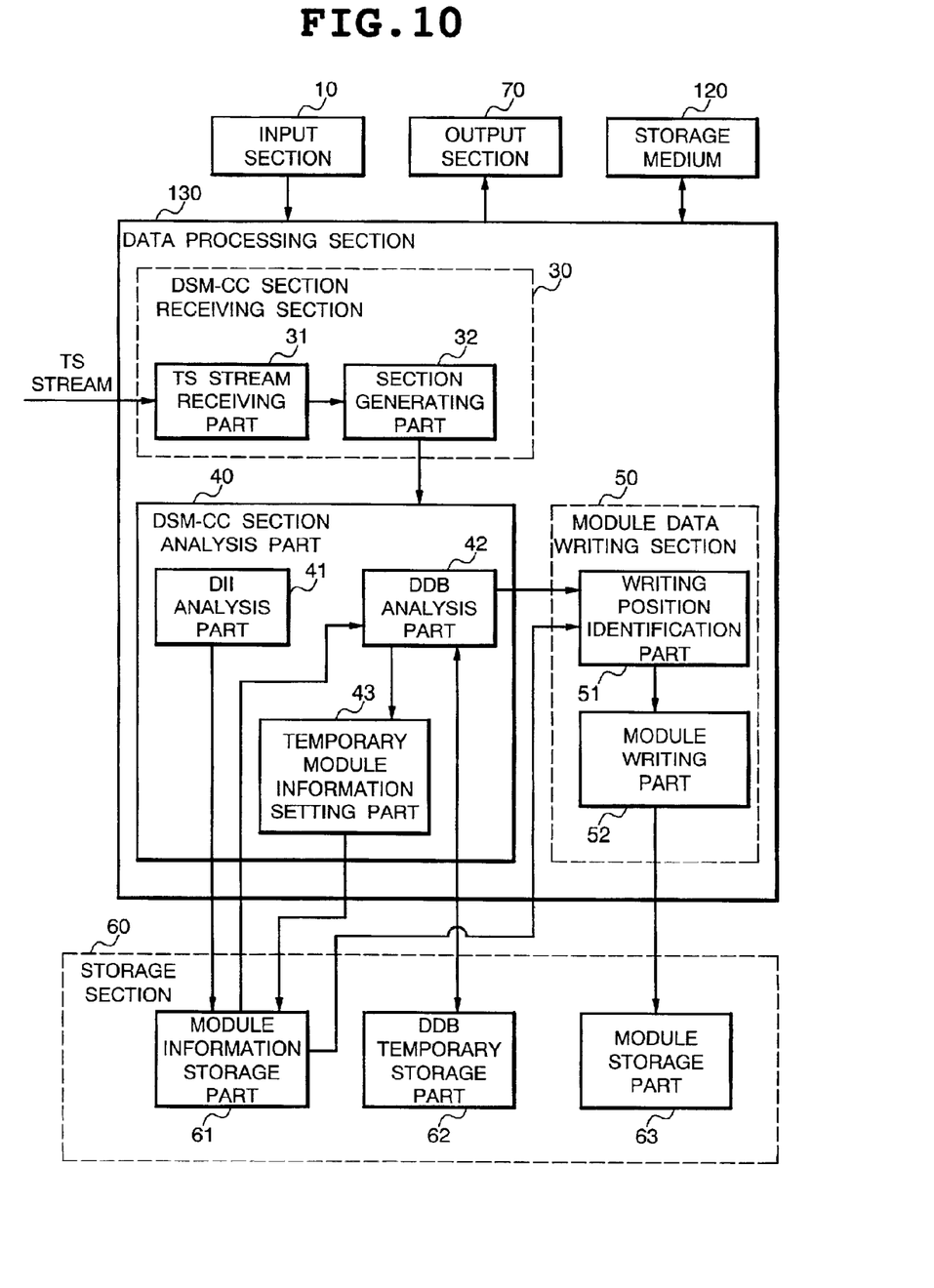
FIG. 10 is a block diagram showing a DSM-CC carousel receiver's structure according to a fourth embodiment of the present invention.

FIG. 10 is a block diagram showing a structure of the DSM-CC carousel receiver according to a fourth embodiment of the present invention. The DSM-CC carousel receiver of FIG. 10 according to the fourth embodiment of the invention has the same structure as that of the DSM-CC carousel receiver shown in FIG. 1 according to the first embodiment of the invention except that a recording medium 120 having recorded a DSM-CC carousel receive program is connected to a data processing section 130, and like reference numerals are used to designate like components. And, operations of the same components are the same as those of the DSM-CC carousel receiver according to the first embodiment of the invention.

The recording medium 120 may be a magnetic disk, a semiconductor memory or another medium. The DSM-CC carousel receiving program is read from the recording medium 120 into the data processor 130 and controls the operation of the data processor 130. According to the control by the data receiving program, the data processor 130 executes the same processing as that by the data processors 20, 80, 100 in the first to third embodiments of the invention.

Even when DDB configuring the DII unobtained module is received as described above, discarding or the like does not occur because all DDB sections are received as effective data so to write the module by setting temporary module information in the temporary module information setting part 43 or calculating the data size of one section from the section size of DDB. And the obtained DSM-CC section can be received without discarding, and the module receiving time can be shortened.

As described above, according to the present invention, in the DSM-CC carousel receiver which receives data and stores it in the storage section by using the DSM-CC (Digital Storage Media-Command and Control) carousel comprising two types of sections, DII (Download Info Indication) which contains information on a module being sent out and DDB (Download Data Block) which contains data configuring a module, a transport stream of MPEG2 (Moving Picture Experts Group-2) is received, one forming the DSM-CC section is extracted from the received transport stream, and it is judged whether the extracted DSM-CC section is DDB configuring a DII unobtained module. When it is judged as DDB which configures the DII unobtained module, temporary module information is set for the pertinent DDB, the DDB configuring the DII unobtained module is written into the storage section according to the temporary module information. Thus, it has effects that reception can be made without discarding the obtained DSM-CC section and the data module receiving time can be shortened.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A DSM-CC carousel receiver which receives data and stores the same into a storage means by using DSM-CC (Digital Storage Media-Command and Control) carousel comprised of two types of sections, DII (Download Info Indication) including information related to a module being sent out and DDB (Download Data Block) including data configuring the module, comprising:

a DSM-CC section receiving means for receiving a transport stream of MPEG2 (Moving Picture Experts Group-2) and extracting what forming a DSM-CC section;

a DSM-CC section analysis means for judging whether the DSM-CC section extracted by said DSM-CC section receiving means is DDB configuring the DII unobtained module;

a temporary module information setting means for setting temporary module information for the DDB when it is judged to be DDB, which configures the DII unobtained module, by said DSM-CC section analysis means; and a writing means for writing the DDB configuring the DII unobtained module into said storage means according to the temporary module information determined by said temporary module information setting means.

2. The DSM-CC carousel receiver as set forth in claim 1, wherein said DSM-CC section analysis means having a DDB analysis means for judging whether the DII is obtained or not by analyzing the DDB when the DSM-CC section extracted by said DSM-CC section receiving means is the DDB.

3. The DSM-CC carousel receiver as set forth in claim 2, further comprising:

a DDB temporary storage means for temporarily storing the received DDB when a size of the module data included in one section of the DDB is unknown;

the DDB analysis means calculating a data size of one section from a section size of the received DDB and the DDB temporarily stored in said DDB temporary storage means.

4. The DSM-CC carousel receiver as set forth in claim 3, wherein said DDB analysis means judges the data size from a condition that when a block position of the acquired DDB is a predetermined value, a size of actual data area of the DDB is determined to be a data size for one section of DDB and a condition that sizes of actual data areas of two DDBs having the same module identification are compared, and a size of an actual data area of DDB having a smaller value of block position values between the DDBs is determined as a data size for one section of DDB.

5. The DSM-CC carousel receiver as set forth in claim 1, wherein said DSM-CC section receiving means having a transport stream receiving means for receiving a transport stream of MPEG2 (Moving Picture Experts Group-2), and a section receiving means for extracting what forming a DSM-CC section from the transport stream received by said transport stream receiving means and giving it to said DSM-CC section analysis means.

6. The DSM-CC carousel receiver as set forth in claim 1, wherein said DSM-CC section analysis means having a DDB analysis means for judging whether the DII is obtained or not by analyzing the DDB when the DSM-CC section extracted by said DSM-CC section receiving means is the DDB, and said, DSM-CC section receiving means having a transport stream receiving means for receiving a transport stream of MPEG2 (Moving Picture Experts Group-2), and a section receiving means for extracting what forming the DSM-CC section from the transport stream received by said transport stream receiving means and giving it to said DSM-CC section analysis means.

7. The DSM-CC carousel receiver as set forth in claim 1, further comprising a DDB temporary storage means for temporarily storing the received DDB when a size of module data included in one section of the DDB is unknown, wherein said the DSM-CC section analysis means having a DDB analysis means for judging whether the DII is obtained or not by analyzing the DDB when DSM-CC section extracted by said DSM-CC section receiving means is the DDB, said DDB analysis means calculates a data size of one section from DDB temporarily stored in said DDB temporary storage means and the section size of the received DDB, and said DSM-CC section receiving means having a transport stream receiving means for receiving a transport stream of MPEG2 (Moving Picture Experts Group-2), and a section receiving means for extracting what forming the DSM-CC section from the transport stream received by said transport stream receiving means and giving it to said DSM-CC section analysis means.

8. The DSM-CC carousel receiver as set forth in claim 7, wherein said DDB analysis means judges the data size from a condition that when a block position of the acquired DDB is a predetermined value, a size of actual data area of the DDB is determined to be a data size for one section of DDB and a condition that sizes of actual data areas of two DDBs having the same module identification are compared, and a size of an actual data area of DDB having a smaller value of block position values between the DDBs is determined as a data size for one section of DDB.

9. The DSM-CC carousel receiver as set forth in claim 1, wherein said DSM-CC carousel analysis means having a DII analysis means for extracting the described module information by analyzing the DII when the DSM-CC section extracted by said DSM-CC section receiving means is the DII.

10. The DSM-CC carousel receiver as set forth in claim 1, wherein the writing means having a writing position identification means for calculating a writing position within the module of the actual data area of the obtained DDB, and a module writing means for writing the actual data area of the DDB into said storage means according to the writing position calculated by said writing position identification means.

11. The DSM-CC carousel receiver as set forth in claim 1, further comprising a program identification means for identifying whether one section of the received DSM-CC section is included in a program to be received when each DSM-CC carousel is a unit of the program in a state that the DSM-CC carousels can be received in multiple simultaneously.

12. The DSM-CC carousel receiver as set forth in claim 1, further comprising a progress status display means for showing the progress of reception of the DSM-CC carousel.

13. A DSM-CC carousel receiving method which uses a DSM-CC (Digital Storage Media-Command and Control) carousel comprised of two types of sections, DII (Download Info Indication) including information related to a module being sent out and DDB (Download Data Block) including data configuring the module, to receive data and stores the same into a storage means, comprising the following steps of:

receiving a transport stream of MPEG2 (Moving Picture Experts Group-2) and extracting what forming a DSM-CC section;

judging whether the DSM-CC section extracted is DDB configuring the DII unobtained module;

setting temporary module information for the DDB when it is judged to be DDB, which configures the DII unobtained module; and writing the DDB configuring the DII unobtained module into said storage means according to the temporary module information.

14. The DSM-CC carousel receiving method as set forth in claim 13, further comprising a step of analyzing the DDB when the DSM-CC section extracted from the received transport stream is the DDB and judging whether the DII is received or not.

15. The DSM-CC carousel receiving method as set forth in claim 14, wherein said DDI unacquisition judging step calculates a data size of one section from a section size of the received DDB and the DDB temporarily stored in said DDB temporary storage means which temporarily stores the received DDB when a data size of the module data included in the one section of the DDB is unknown.

16. The DSM-CC carousel receiving method as set forth in claim 15, wherein said DII unacquisition judging step judges the data size from a condition that when a block position of the acquired DDB is a predetermined value, a size of actual data area of the DDB is determined to be a data size for one section of DDB and a condition that sizes of actual data areas of two DDBs having the same module identification are compared, and a size of an actual data area of DDB having a smaller value of block position values between the DDBs is determined as a data size for one section of DDB.

17. The DSM-CC carousel receiving method as set forth in claim 13, further comprising a step of extracting the described module information by analyzing the DII when the DSM-CC section extracted by the DSM-CC section extracting step is the DII.

18. The DSM-CC carousel receiving method as set forth in claim 13, wherein said step of writing into the storage means including a step of calculating a writing position in a module of the actual data area of the obtained DDB, and a step of writing the actual data area of the DDB into said storage means according to the calculated writing position.

19. The DSM-CC carousel receiving method as set forth in claim 13, further comprising a step of identifying whether one section of the received DSM-CC section is included in a program to be received when each DSM-CC carousel is a unit of the program in a state that the DSM-CC carousels can be received in multiple simultaneously.

20. A computer readable memory for storing a DSM-CC (Digital Storage Media-Command and Control) carousel reception control program which makes a DSM-CC carousel received in a DSM-CC carousel receiver which uses the DSM-CC carousel comprised of two types of sections, DII (Download Info Indication) including information related to a module being sent out and DDB (Download Data Block) including data configuring the module, to receive data and stores it into a storage means, characterized in that the DSM-CC carousel reception control program:

receives a transport stream of MPEG2 (Moving Picture Experts Group-2) into the DSM-CC carousel receiver and extracts what forming a DSM-CC section;

judges whether the extracted DSM-CC section is DDB configuring the DII unobtained module;

sets temporary module information for the DDB when it is judged to be DDB configuring the DII unobtained module; and writes the DDB configuring the DII unobtained module into said storage means according to the temporary module information.

21. The computer readable memory for storing a DSM-CC carousel reception control program as set forth in claim 20, wherein said DSM-CC carousel reception control program includes a step of judging whether the DII is obtained or not by analyzing the DDB when the DSM-CC section extracted from the received transport stream is the DDB.

22. The computer readable memory for storing a DSM-CC carousel reception control program as set forth in claim 21, wherein when it is judged whether the DDI is obtained or not, said DSM-CC carousel reception control program calculates a data size of one section from a section size of the received DDB and the DDB temporarily stored in said DDB temporary storage means for temporarily storing the received DDB when a size of module data included in one section of the DDB is unknown.

23. The computer readable memory for storing a DSM-CC carousel reception control program as set forth in claim 22, wherein when it is judged whether the DDI is obtained or not, said DSM-CC carousel reception control program judges the data size from a condition that when a block position of the acquired DDB is a predetermined value, a size of actual data area of the DDB is determined to be a data size for one section of DDB, and a condition that sizes of actual data areas of two DDBs having the same module identification are compared, and a size of an actual data area of DDB having a smaller value of block position values between the DDBs is determined as a data size for one section of DDB.

24. The computer readable memory for storing a DSM-CC carousel reception control program as set forth in claim 20, wherein said DSM-CC carousel reception control program includes a step of extracting the described module information by analyzing the DII when the DSM-CC section extracted is the DII.

25. The computer readable memory for storing a DSM-CC carousel reception control program as set forth in claim 20, wherein when writing into the storage means, said DSM-CC carousel reception control program calculates a writing position in a module of the actual data area of the obtained DDB and writes the actual data area of the DDB into said storage means according to the calculated writing position.

26. The computer readable memory for storing a DSM-CC carousel reception control program as set forth in claim 20, wherein said DSM-CC carousel reception control program identifies whether one section of the received DSM-CC section is included in a program to be received when each DSM-CC carousel is a unit of the program in a state that the DSM-CC carousels can be received in multiple simultaneously.

* * * * *